United States Patent [19]

Mizner et al.

[11] Patent Number: 5,318,643
[45] Date of Patent: Jun. 7, 1994

[54] VEHICLE TIRES INCLUDING PLIES WITH HIGH STRENGTH REINFORCEMENT

[75] Inventors: Eric C. Mizner, Copley; Paul W. Hobart, Wadsworth; Italo M. Sinopoli, Canton, all of Ohio

[73] Assignee: The Goodyear Tire & Rubber Company, Akron, Ohio

[21] Appl. No.: 129,614

[22] Filed: Sep. 30, 1993

Related U.S. Application Data

[63] Continuation-in-part of Ser. No. 496,759, Mar. 21, 1990, and a continuation-in-part of Ser. No. 830,029, Jan. 31, 1992.

[51] Int. Cl.$^5$ .................... B60C 9/18; B60C 9/20
[52] U.S. Cl. .................... 152/527; 152/451; 152/526; 152/556; 57/902
[58] Field of Search .......... 152/451, 527, 556, 526, 152/534–535; 57/213, 230, 902

[56] References Cited

U.S. PATENT DOCUMENTS

| | | | |
|---|---|---|---|
| 2,006,315 | 6/1935 | Hopkinson | 152/556 X |
| 2,188,174 | 1/1940 | Castricum et al. | 152/556 |
| 2,317,912 | 4/1943 | Howe | 152/556 |
| 3,513,898 | 5/1970 | Lugli et al. | 152/526 X |
| 4,158,946 | 6/1979 | Bourgois | 152/451 X |
| 4,363,346 | 12/1982 | Pepe | 152/356 R |
| 4,516,395 | 5/1985 | Palmer et al. | 57/237 |
| 4,586,324 | 5/1986 | Mizuma | 57/212 |
| 4,608,817 | 9/1986 | Brandyberry et al. | 57/213 |
| 4,628,683 | 12/1986 | Bourgois et al. | 152/556 X |
| 4,651,513 | 3/1987 | Dambre | 152/451 X |
| 4,785,617 | 11/1988 | Bourgois et al. | 57/58.52 |
| 4,960,473 | 10/1990 | Kim et al. | 148/12 B |
| 4,966,216 | 10/1990 | Kanasaki et al. | 152/556 |
| 5,027,877 | 7/1991 | Tamura et al. | 152/527 |
| 5,088,538 | 2/1992 | Navaux | 152/526 X |
| 5,111,864 | 5/1992 | Nakano et al. | 152/527 |

FOREIGN PATENT DOCUMENTS 3420120 12/1984 Fed. Rep. of Germany ...... 152/451

OTHER PUBLICATIONS

Mechanics of Pneumatic Tires, ed. Samuel Clark; US Dept of Transportation, Aug. 1981, pp. 219–220.

Primary Examiner—Michael W. Ball
Assistant Examiner—Adrienne C. Johnstone
Attorney, Agent, or Firm—T. P. Lewandowski

[57] ABSTRACT

Tires of a large size for use off-the-road with super tensile reinforcement having values of at least 4655N (1046 lbs) break strength for bunched type cord.

34 Claims, 5 Drawing Sheets

VEHICLE TIRES INCLUDING PLIES WITH HIGH STRENGTH REINFORCEMENT

This application is a CIP of copending U.S. applications Ser. No. 07/496,759 and 07/830,029 filed on Mar. 21, 1990 and Jan. 31, 1992, respectively and also co-pending with PCT/US91/01906 filed on Mar. 21, 1991. Assignee's U.S. Pat. No. 4960473 issued Oct. 2, 1990, discloses steel alloys for reinforcing wires/filaments for rubber products with increased strength and ductility and their process of manufacture which is hereby incorporated by reference thereto.

The present invention relates to cord reinforced plies for vehicle tires.

Particularly, the present invention relates to a tire carcass or belt, and wherein at least one of multiple plies in the belt has the cords therein biased with respect to the direction of rotation of the tire while for the carcass the cords in the ply may be biased or radial. More particularly, the present invention relates to large tires for off-the-road use with super tensile reinforcement in the belts and/or carcass.

There has been use of single strand cords of multi filaments which are not twisted about each other but rather twisted altogether as a bundle or bunch (bunched cord) to simplify the cord construction. Higher fatigue life requirements for composites in tires have resulted in cords with smaller filament diameter requiring more filaments in the cord to obtain the necessary strength.

The above bunched cords generally have not found use in larger tires, such as off-the-road tires, because they were not strong enough. Even with the advent of high tensile filament such as in Assignee's 2× cord, disclosed for use in passenger tires, the above large tires continued to use stranded cord of normal tensile tire cord filament such as 7×7×.22 cord comprising seven strands of seven filaments of 0.22 millimeter diameter filament.

Problems had to be overcome even after development of the above steel alloys and filaments. The higher strength steel alloys resulted in changes in cord modulus giving rise to the possibility of adjusting the parameters of a tire belt gross load which depend upon three factors assuming adequate cord to rubber adhesion. The factors are cord modulus, the ratio of cord volume to rubber volume which is often expressed as the number of cord ends per inch, and the angle of cord reinforcement. As the angle of cord reinforcement approaches the direction of rotation of the tire, the support from the reinforcement in the lateral direction moves toward zero. An increase in the above-mentioned two other cord related factors generally results in an increase of weight for the belt. Added weight means added cost and higher rolling resistance of a tire. Lighter cords with a lower modulus do not solve the problem because even though they have lower weight, they also have a lower cord modulus which must be offset by increasing the ratio of cord to rubber volume. This increase in cord volume is limited by the physical size of the cord and the resulting spacing between the cords which governs the ability of the rubber to penetrate between the cords for good adhesion.

The challenge was to determine cord structure which could take advantage of the new cord modulus while not adversely affecting cord volume to rubber volume ratio on lateral reinforcement.

After considerable study, effort, testing and time, the present invention provided cords for off-the-road tires which substantially reduced the size of the cord for these tires. While a reduction in the size of the cord would lead one to expect a reduction in weight, this would not necessarily be the case where the filament size was increased. Under such circumstances, cord was found for use in these tires by varying the ends per inch (EPI) in the plies of the belt and carcass. Other advantages which exist in the present invention include a reduction in the cord gum coat gauge between the cord layers in the belt and weight reduction due to reduction in weight of reinforcement as well as reduction in an amount of gum gauge. Also, there was a reduction in cost for the tires of the present invention.

As indicated below, the present invention will be shown to have substantially maintained the gross load for a tire belt while reducing weight and cost using stronger filament in cord constructions not useable previously, even with high tensile filaments, and accompanying cord volumes and angles which reduce material in the tire. Similar advantages have been achieved with carcass plies as well.

This invention provides a pneumatic tire with a carcass having cords, two sidewalls spaced apart a distance, which in the axial direction determines the general width of the tire section, two beads each one of which around which are turned up the ends of the cords of the carcass, a tread disposed on the crown of the carcass, and a belt structure that is circumferentially inextensible interposed between the tread and the carcass, the belt structure having a width that is substantially equal to that of the tread and having at least four radially overlapped layers of elastomeric fabrics reinforced with metallic cords, the metallic cords in three of the layers being 5+8+14×.265ST+1 construction parallel to each other within each layer and inclined at an angle of between 21° and 23° with respect to the equatorial plane of the tire and at opposite inclinations to adjacent layers, the belt structure having a first layer radially inward most with the metallic cords spaced at 8 EPI (3.14 ends/cm), a second layer on top of the first with the metallic cords spaced at 11 EPI (4.34 ends/cm), a third layer on top of the second layer with the metallic cords spaced at 11 EPI (4.34 ends/cm), and a fourth layer of 3×7×.22NT cord at 8 EPI (3.14 end/cm) on top of the third layer inclined at an angle between 21° and 23° and opposite to the inclination of the third layerwith respect to the equitorial plane of the tire.

This invention further provides a pneumatic tire of 25 inch and greater bead diameter with a carcass having cords, two sidewalls spaced apart a distance, which in the axial direction determines the general width of the tire section, two beads each one of which around which are turned up the ends of the cords of the carcass, a tread disposed on the crown of the carcass, and a belt structure that is circumferentially interposed between the tread and the carcass, the belt structure having a width that is substantially equal to that of the tread and having multiple radially overlapped layers of elastomeric fabric reinforced with cords, the cords in at least one layer being metalic of 27× construction being parallel to each other within the layer, the cord strength being at least 1100 lbs (4893N ).

Super tensile cords have the advantages of a 7 to 9% increase in cord break load over a predecessor cord made of high tensile steel. Those cords having a smaller cord diameter over previously used cord in a reinforcement of at least one layer of belt or ply of the present invention results in less rubber gauge being used. A smaller diameter cord results in less weight in the reinforcement.

Further, the above cords result in lower linear density in the reinforcement for which they are used which again results in less weight and lower cost for the reinforcement and the tire.

Starting in November of 1989 through January of 1991, a total of 549 off-the-road (OTR) tires were built in nine different sizes and sold in order to be able to field test these tires. Enough information has been gathered to date to conclude these tires are at least equal in performance to their predecessor tires. Testing continues which may show even further advantages over those noted herein, but enough information now exists to go forward with the first production tires in March of 1992.

The above advantages of the invention will become readily apparent to one skilled in the art from reading the following detailed description of an embodiment of the invention when considered in the light of the accompanying drawings in which.

As used herein and in the Claims:

"Axial" and "axially" are used herein to refer to lines or directions that are parallel to the axis of rotation of the tire.

"Bead" means the part of the tire comprising an annular tensile member wrapped by ply cords and shaped, with or without other reinforcement elements such as flippers, chippers, apexes, toe guards and chafers, to fit the design rim.

"Belt structure" means at least two layers or plies of parallel cords, woven or unwoven, underlying the tread, unanchored to the bead, and having both left and right cord angles with respect to the equatorial plane of the tire.

"Carcass" means the tire structure apart from the belt structure, tread, undertread, and sidewall rubber over the plies, but including the beads.

"Cord" means one or more of the reinforcement elements, formed by one or more filaments/wires which may or may not be twisted or otherwise formed which may further include strands so formed which strands may or may not be also formed, of which the plies in the tire are comprised.

"Crown" means that portion of the tire within the width limits of the tire tread.

"Density" means quantity per unit length.

"Equatorial plane (EP)" means the plane perpendicular to the tire's axis of rotation and passing through the center of its tread.

"Gauge" means material thickness.

"Radial" and "radially" are used to mean directions radially toward or away from the axis of rotation of the tire.

"Rivet" means the open space between cords in a layer.

"Section width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Stiffness Ratio" means the value of the control belt structure stiffness divided into the value of another belt structure when the values are determined by a fixed three (3) point bending test having both ends of the cord fixed and flexed by a load centered between the fixed ends.

"Super Tensile Steel" (ST) means a steel as defined in the above referenced Patent Number 4960473, or a tensile strength of at least $TS = K_1 - K_2 D$ where $D_1 = 4080 m/mm^2$, $D_2 = 2000 N/mm^2$ and D is the filament diameter in mm.

"Tread" means that portion of a tire that comes into contact with the road when the tire is normally inflated and under normal load.

"Inch Strength" means the average strength in tension of one inch width of reinforced ply obtained by taking cord break strength times the EPI, ie the number of cords in an inch.

Figure 1:
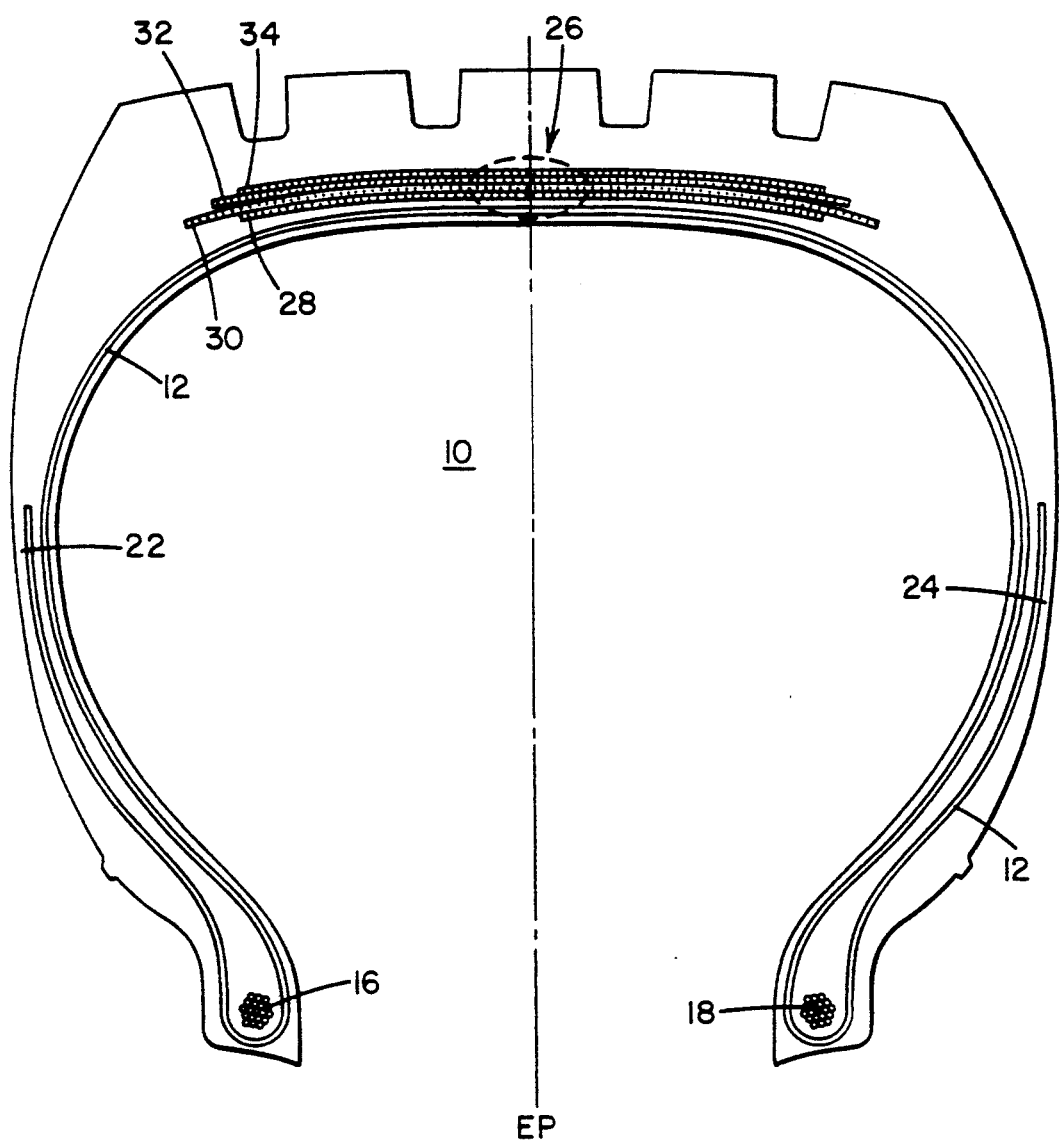
FIGS. 1-3 illustrate schematic tire sections having structures according to the present invention.
Figure 2:
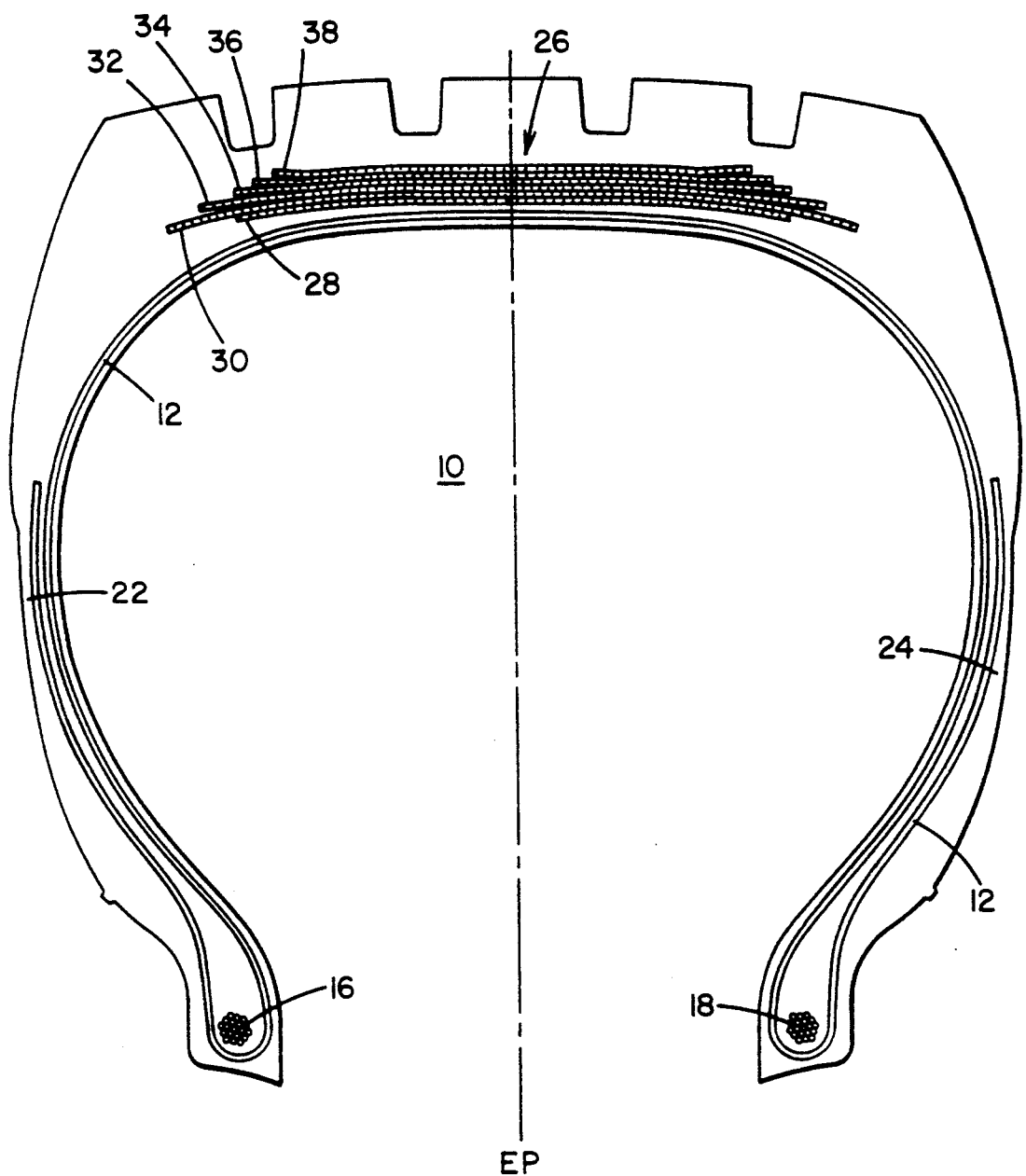
Figure 3:
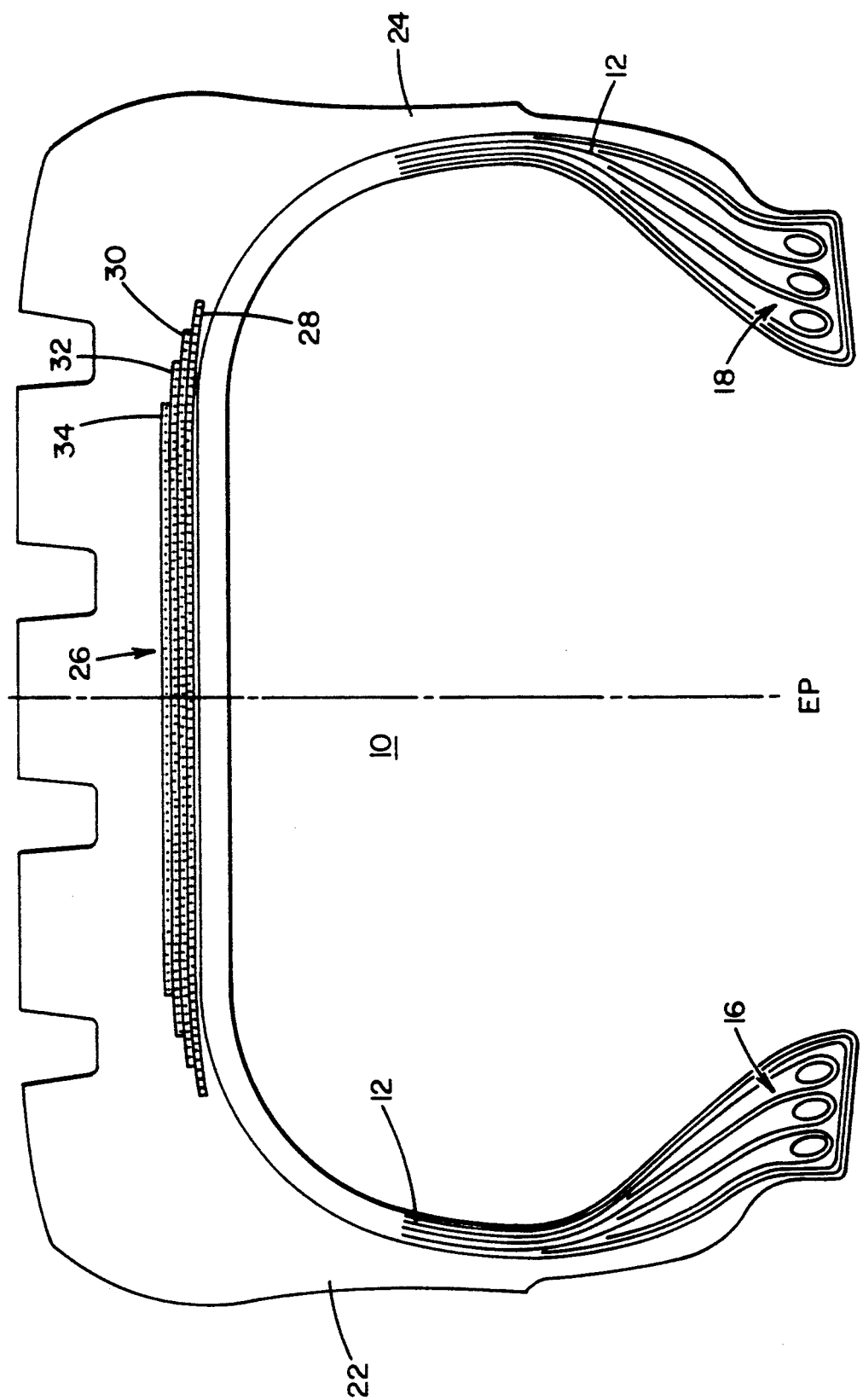

Referring to FIGS. 1-3 of the drawings, a ply 12 is shown within pneumatic tires 10 with a carcass wherein like elements have received like reference numerals. The tires 10 of FIGS. 1 and 2 have radial carcasses while that of FIG. 3 has a bias carcass. For the purposes of the present invention, a tire has a radial ply carcass structure when the cords of the carcass reinforcing ply are oriented at angles in the range of 75° to 90° with respect to the equatorial plane (EP) of the tire, otherwise it is a bias ply. More than one ply may be used in a single carcass The tire 10 has a pair of substantially inextensible annular beads 16,18 which are axially spaced apart from one another. Each of the beads 16,18 is located in a bead portion of the tire 10 which has exterior surfaces configured to be complimentary to the bead seats and retaining flanges of a rim (not shown) upon which the tire 10 is designed to be mounted. Plies 12 may be of side-by-side reinforcing cords of the present invention such as 27×.265ST or 5+8+14×.265ST+1, or alternately of other suitable material, and extend between the beads with an axially outer portion of the carcass structure folded about each of the beads.

Figure 5:
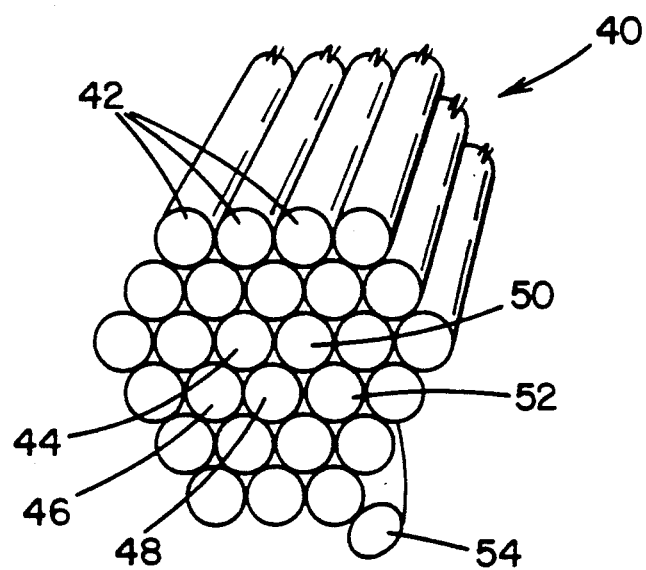
FIG. 5 is a cross section through a cord in accordance with an embodiment of the present invention.

Elastomeric sidewalls 22,24 are disposed axially outwardly of the carcass structure. A circumferentially extending belt structure 26 comprising in the embodiments shown four layers 28, 30, 32, 34 (FIGS. 1 & 3), or six layers 28,30,32,34,36,38 (FIG. 2), each of which preferably comprises steel reinforcing cords 40 (FIG. 5) is characterized by the cords 40 having filaments 42 with a breaking strength of at least 3650 N/mm² for a 0.20mm filament size. While four and six layer belts are illustrated, other numbers are applicable as well.

Preferably the cords 40 are comprised of 27 filaments of finely drawn super tensile steel wire. As noted in the application incorporated by reference above, there are a number of metallurgical embodiments which result in the tensile strength defined above as super tensile (ST). Table 1 below gives calculated values of filament break load for super tensile filaments in comparison to previous high tensile filaments for various filament diameters. The first group being filaments which were made and the second group additional sizes identified as useful and to be made. In each case, the super tensile gives a higher value

TABLE 1

FILAMENT STRENGTH ANALYSIS

| FIL. DIA. (mm) | HT Brk Load, Lbs | ST Brk Load, Lbs |
| --- | --- | --- |
| .20 | 24.1 | 25.9 |
| .22 | 28.9 | 31.1 |
| .255 | 38.0 | 40.8 |
| .28 | 45.4 | 48.5 |
| .350 | 68.9 | 72.9 |
| .30 | 51.8 | 55.1 |
| .325 | 59.9 | 64.1 |
| .380 | 79.4 | 84.5 |

In addition to the determination of the above candidates to qualify for super tensile steels, it was also necessary to determine those which were further capable of long fatigue life, and more particularly those adaptable to tire cord filament. Super tensile candidates which qualified for strength did not always give long fatigue life. As a result, some candidates were found suitable, while others were not, and still others were preferred.

The cords 40 used in the working example have a structure of twenty-seven filaments 42 of 0.265mm diameter super tensile steel wire and a cord 40 break strength of 4900 Newtons plus or minus 245 Newtons. When the cord strength is taken times the EPI, for example, 11EPI for the working example, An inch strength of 12,000 (53,900N)is obtained for the mid plies. Each cord 40 has more preferably, five filaments 44-52 twisted together with a 16mm lay length and these five filaments 44-52 are overlayed with eight filaments which in turn are overlayed with 14 filaments all at a 16mm lay length and all twisted in the same direction. This most preferred cord is designated as 5+8+14×.265ST. The cord construction is known for its compactness, strength, and high cord efficiency. The 0.265 designates the filament diameter in millimeters and the ST designates the material being super tensile. The cord 40 may have a wrap filament 54.

Cord 40 replaces 7×7×.25+1HT and 7×7×.22+1NT in both belts and carcass. Further, the new cord has a reduction in cord diameter over the replaced candidates and is of a simpler construction; i.e., fewer filaments and no strands to enhance cord efficiency in addition to reducing gauge and cost with the previously noted smaller diameter cord making the tires lighter in weight and less costly. The diameter of the present cord is 1.59mm while for 7×7 cords it is 2.25mm and 1.98mm for cord with 0.25 and 0.22mm diameter filaments respectively.

As noted above, a major variant which may be varied in a reinforced composite of elastomer is the end count, or EPI (end per inch), which is the number of cords per unit length in the lateral direction to the direction in which the elastomer is being reinforced. In the case of the present OTR tires, not only was there not a simple substitution of material for the reinforcing cord, but the cord was changed. The filament size increased and no increase in rivet was experienced as a result of the increased strength of the super tensile cord nor could a reduction in EPI be used. Rather, while increasing the filament diameter and reducing the cord diameter the end count was increased to off-set these changes and the rivet was reduced. Generally, a minimum rivet of 0.018" must be maintained to give proper penetration of elastomers between cords when they are so embedded. This minimum rivet is particularly obtainable with the smaller diameter and simpler (no strands in a cord) cord construction.

The same considerations which exist for a single layer or ply above also exist for multi layer and/or belt constructions as depicted for example tire 24.00R35 in Table 2 below.

TABLE 2

| BELT LAYER | CORDS | EPI | AVG IN STR |
| --- | --- | --- | --- |
| | INCH STRENGTH | | |
| | CONTROL | | |
| 1 | 7 × 7 × .22NT + 1 | 8 | 39360 |
| 2 | 7 × 7 × .25HT + 1 | 8 | 53600 |
| 3 | 7 × 7 × .25HT + 1 | 8 | 53600 |
| 4 | 3 × 7 × .22NT | 8 | 14560 |
| PLY | | | |
| 1 | 7 × 7 × .22NT + 1 | 8 | 39360 |
| | EXAMPLE | | |
| BELT | | | |
| 1 | 5 + 8 + 14 × .265ST + 1 | 8 | 39200 |
| 2 | 5 + 8 + 14 × .265ST + 1 | 11 | 53900 |
| 3 | 5 + 8 + 14 × .265ST + 1 | 11 | 53900 |
| 4 | 3 × 7 × 22NT | 8 | 14560 |
| PLY | | | |
| 1 | 5 + 8 + 14 × .265ST + 1 | 8 | 39200 |

The above changes for the 24.00R35 tire of FIG. 1 also apply to the 36.00R51 tire of FIG. 2 where two additional layers of 5+8+14×.265ST+1 are added to the mid portion of the belt structure 26. Both of these tires have radial carcasses of the same construction. FIG. 3 is a 45/65-45 tire having a reinforcing belt structure with the same layers as that of FIG. 1.

Figure 4:
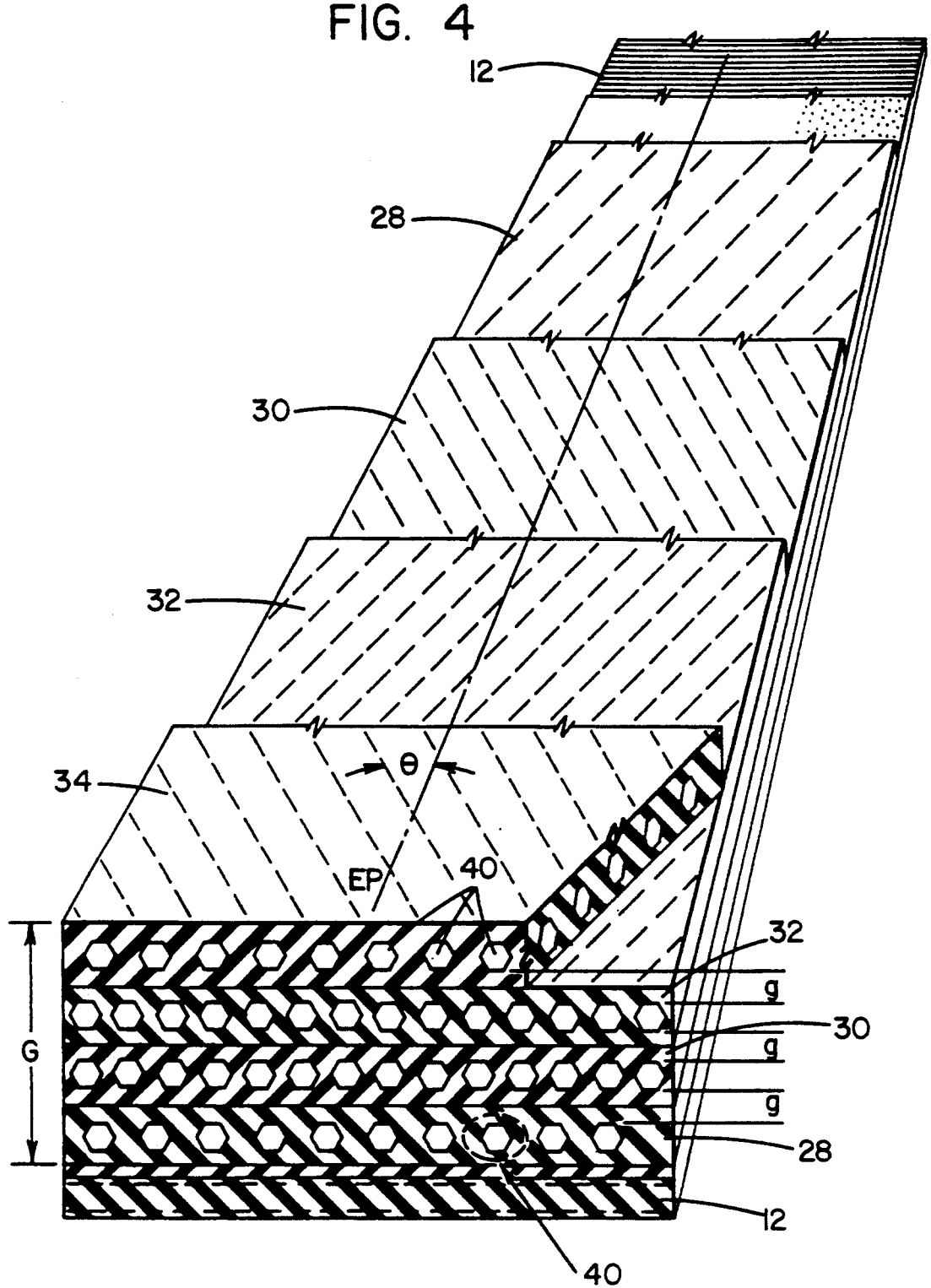
FIG. 4 is a schematic of a portion of a composite in accordance with the present invention.

All the above tires experienced a reduction in belt thickness due to reduction in elastomer gauge in addition to the reduction due to the above noted cord diameter. For example, the structure for the 24.00R35 tire of FIG. 1 is detailed in FIG. 4 wherein the gauge G of this belt structure can be seen together with the gauge g between the layers in the cured tire. In all the tire candidates of this invention the belt gauge G is less than 14mm and the gauge between the layers is less than 2mm, but 2mm is acceptable. Table 3 below gives the gauges for the tire illustrated and for the control tire of Table 2. FIG. 4 also illustrates the cord 40 angles in relation to the equatorial plane EP, which cord 40 angles were noted above to be between 21 and 23 degrees and can be seen to alternate layer to layer. Preferably the cord angle is 22 degrees as indicated by the angle $\theta$ in FIG. 4.

TABLE 3

| COMPONENT | GAUGE SYMBOL | MILLIMETERS |
| --- | --- | --- |
| | CONTROL | |
| Belt Structure | G | 15.52 |
| Belt 1-2 | g | 2.11 |
| Belt 2-3 | g | 2.21 |
| Belt 3-4 | g | 1.88 |
| | EXAMPLE | |
| Belt Structure | G | 13.31 |
| Belt 1-2 | g | 1.96 |
| Belt 2-3 | g | 1.96 |
| Belt 3-4 | g | 1.75 |

Using, again, the 24.00R35 tire, for example, this tire has a four layer belt as depicted in Table 2 above for a prior belt in a control tire and a super tensile belt in the example, respectively. A reduction in belt weight for cord of 15% is achieved by the example over the control tire belt with accompanying savings in cost. Similarly results of 6–7% are achieved for the belt of the bias tire of FIG. 3 and 7%for the 36.00R51 tire belt of FIG. 2. Most recently, a 40.00R57 tire, one with a bead diameter of 57 inches was found to also achieve a weight reduction using the above reinforcement. Due to the large size (12 ft. O.D.) and larger portion of rubber compared to reinforcement, the reduction is limited to 1.7%, but the performance is equal. Also, in the smaller tires (25 inch bead diameter and above) the tires have shown evidence of running cooler which would increase their ton-miles per hour. With the test tires given below, it can be appreciated that the invention is usefull for tires with a bead diameter above 25 inches and particularly with a range of 25 to 57 inches.

While not proven, theoretically the belt reduction is responsible for, or at least contributes to, an improvement in tire performance.

Testing continues with further candidates in off-the-road tires such as 21.00R35, 24.00R49, 26.5R25, 27.00R49 and 33.00R51 size radial tires and 35/65-33 bias tires. Data is still slow coming back on these large tires.

In accordance with the provisions of the patent statues, the principle and mode of operation of the tire have been explained and what is considered to be its best embodiment has been illustrated and described. It should, however, be understood that the invention may be practiced otherwise than as specifically illustrated and described without departing from its spirit and scope.

What is claimed is:

1. A pneumatic tire with a carcass having cords, two sidewalls spaced apart a distance, which in the axial direction determines the general width of the tire section, two beads each one of which around which are turned up the ends of the cords of the carcass, a tread disposed on the crown of the carcass, and a belt structure that is circumferentially interposed between the tread and the carcass, the belt structure having a width that is substantially equal to that of the tread and having at least four radially overlapped layers of elastomeric fabric reinforced with metallic cords, characterized by the metallic cords in three of the layers being 5+8+14×.265ST+1 construction parallel to each other within each layer and inclined at an angle of between 21° and 23° with respect to the equatorial plane of the tire and at opposite inclinations to adjacent layers, the belt structure having a first layer radially inward most with the metallic cords spaced at 8EPI (3.14 ends/cm), a second layer on top of the first with the metallic cords spaced at 11EPI (4.34 ends/cm), a third layer on top of the second layer with the metallic cords spaced at 11 EPI (4.34 ends/cm) and a fourth layer of 3×7×.22NT cord at 8EPI (3.14 ends/cm) on top of the third layer inclined at an angle between 21° and 23° with respect to the equatorial plane of the tire and opposite to the inclination of the third layer.

2. The tire defined in claim 1 wherein the carcass cords are of 27×.265ST construction.

3. The tire defined in claim 1 or 2 wherein the belt structure cords are inclined at angle of 22°.

4. The tire defined in claim 3 wherein the carcass cords are radially oriented.

5. The tire defined in claim 4 wherein the carcass cords are 5+8+14×.265ST+1 construction.

6. The tire defined in claim 3 wherein the carcass cords are spaced at 8EPI (3.14 ends/cm).

7. The tire defined in claim 1 or 2 wherein the belt structure gauge is less than 14mm.

8. The tire defined in claim 7 wherein the belt structure gauge is 13.3mm.

9. The tire defined in claim 1 or 2 wherein the gauge between any two belt layers is less than 2mm.

10. The tire defined in claim 1 or 2 wherein the gauge between any two belt layers is 2mm.

11. A pneumatic off-the-road tire of 25 inch and greater bead diameter with a carcass having cords, two sidewalls spaced apart a distance, which in the axial direction determines the general width of the tire section, two beads each one of which around which are turned up the ends of the cords of the carcass, a tread disposed on the crown of the carcass, and a belt structure that is circumferentially interposed between the tread and the carcass, the belt structure having a width that is substantially equal to that of the tread and having multiple radially overlapped layers of elastomeric fabric reinforced with cords, the cords in at least one layer being metalic and of 27× construction being parallel to each other within the layer, the cord strength being at least 1100 lbs (4893N).

12. The tire defined in claim 11 wherein the inch strength of the at least one layer is 12,100 lbs (53821N).

13. The tire defined in claim 11 or 12 wherein the cords are spaced at 8EPI (3.14 ends/cm).

14. The tire defined in claim 11 or 12 wherein the cords are spaced at 11 EPI 4.34 ends/cm).

15. The tire defined in claim 13 wherein the at least one layer is radially inward most of the multiple radially overlapped layers.

16. The tire defined in claim 15 wherein the cord is 5+8+14×.265ST+1 construction.

17. The tire defined in claim 16 wherein the cords of the at least one layer are inclined at an angle of between 21° and 23° with respect to the equatorial plane of the tire.

18. The tire defined in claim 14 wherein the at least one layer is radially between the inward and outward most layers of the multiple radially overlapped layers.

19. The tire defined in claim 18 wherein the cord is 5+8+14×.265ST+1 construction.

20. The tire defined in claim 19 wherein the cords of the at least one layer are inclined at an angle of between 21° and 23° with respect to the equatorial plane of the tire.

21. The tire defined in claim 11 wherein at least two of the multiple radially overlapped layers of elastomeric fabric reinforced with cords are reinforced with metalic 27× cord construction being parallel to each. other within the layer and have a cord strength of at least 1100 lbs (4893N)

22. The tire defined in claim 11 wherein at least three of the multiple radially overlapped layers of elastomeric fabric reinforced with cords are reinforced with metalic 27× cord construction being parallel to each other within the layer and having a cord strength of at least 1100 lbs (4893N).

23. The tire defined in claim 11 or 12 wherein the inch strength of the at least two and at least three layers are 12,100 lbs (53821N).

24. The tire defined in claim 11 wherein the cords are spaced at 11EPI (4.34 ends/cm) in the at least two layers.

25. The tire defined in claim 12 wherein the cords are spaced at 8EPI (3.14 ends/cm) in one of the at least three layers and at 11EPI (4.34 ends/cm) in the other two of the at least three layers.

26. The tire defined in claims 11 or 12 wherein the cords of the at least one layer are inclined at an angle of between 21° and 23° with respect to the equatorial plane of the tire.

27. The tire defined in claims 11 or 12 wherein the cord is 5+8+14×.265ST+1 construction.

28. The tire defined in claims 11 or 12 wherein the carcass cords are of 27×.265ST construction.

29. The tire defined in claim 28 wherein the carcass cords are radially oriented.

30. The tire defined in claims 29 wherein the carcass cords are 5+8+14×.265ST+1 construction.

31. The tire defined in claim 30 wherein the carcass cords are spaced at 8EPI (3.14 ends/cm).

32. The tire defined in claims 11 or 12 wherein the belt structure gauge is less than 14mm.

33. The tire defined in claims 11 or 12 wherein the belt structure gauge is 13.3mm.

34. The tire defined in claims 11 or 12 wherein the gauge between any two belt layers is less than 2mm.

* * * * *